United States Patent [19]

Abeles

[11] 4,022,024
[45] May 10, 1977

[54] THERMOSIPHON ENGINE AND METHOD

[76] Inventor: Eugenio Eibenschutz Abeles, Fresas No. 102-602, Mexico City 12, D.F., Mexico

[22] Filed: May 13, 1975

[21] Appl. No.: 577,028

[30] Foreign Application Priority Data

May 14, 1974  Mexico ................. 151209

[52] U.S. Cl. .................. 60/641; 60/650; 60/682
[51] Int. Cl.² ................. F01K 25/02
[58] Field of Search ........... 60/643, 641, 655, 670, 60/530, 682, 650

[56] References Cited

UNITED STATES PATENTS

| | | | |
|---|---|---|---|
| 1,032,236 | 7/1912 | Patten ................. | 60/650 |
| 1,343,577 | 6/1920 | Okey ................. | 60/641 |
| 1,989,999 | 2/1935 | Niederle ................. | 60/641 |
| 2,636,129 | 4/1953 | Agnew ................. | 126/271 X |
| 2,968,916 | 1/1961 | Taylor et al. ................. | 60/641 |
| 3,055,170 | 9/1962 | Westcott ................. | 60/530 |
| 3,756,268 | 9/1973 | Lefever ................. | 137/375 X |
| 3,822,692 | 7/1974 | Demarest ................. | 60/641 X |

*Primary Examiner*—Allen M. Ostrager
*Attorney, Agent, or Firm*—Albert L. Jeffers; Roger M. Rickert

[57] ABSTRACT

A thermal engine in which two interconnected columns of liquid form a closed path with one of the columns being heated and the other being cooled thereby to induce circulation of the liquid in the closed path. A fluid actuated rotary member is placed in the path and power can be taken from a shaft connected thereto. The column in which the liquid rises can be heated by sunlight, especially by attaching panels to the column, or it can be heated by combustion, and the column in which the liquid moves downwardly may be cooled by radiation or convection or by passing a cooling fluid therealong.

13 Claims, 3 Drawing Figures

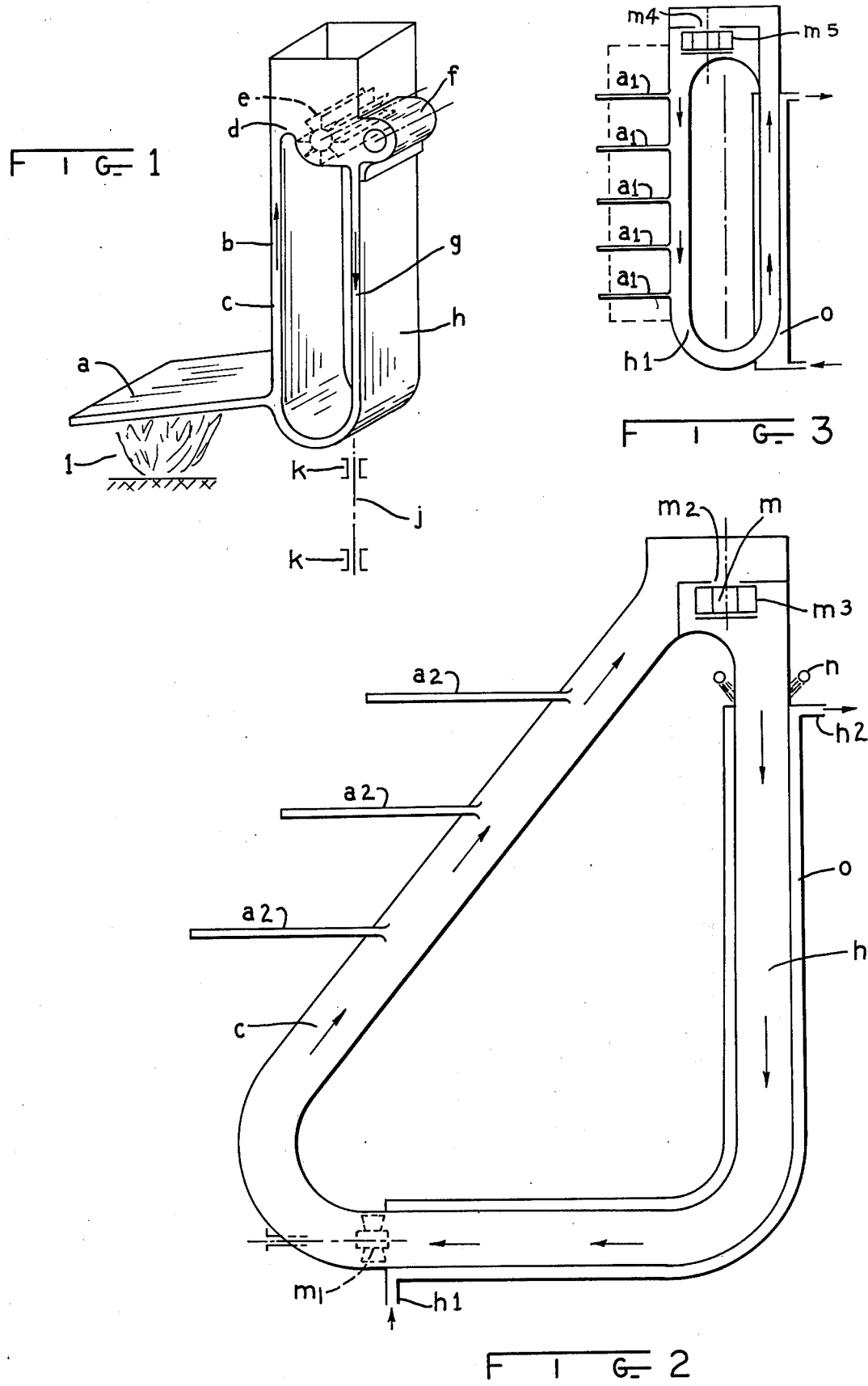

THERMOSIPHON ENGINE AND METHOD

CROSS REFERENCE TO RELATED APPLICATIONS

Applicant claims the benefit of the filing date, under 35 U.S.C. No. S119, of patent application No. 151209, filed in Mexico on May 14, 1974.

BACKGROUND OF THE INVENTION

The present invention refers to a thermal engine, especially a thermal engine operating on the known thermosiphon principle.

The thermosiphon principle is well known but has not, heretofore, been applied to the construction of engines. An engine constructed according to the thermosiphon principle has a relatively low efficiency but has the advantage of simple construction and extremely low cost of operation and the possibility of being erected in any convenient location. In addition, an engine according to the present invention does not require the use of expensive energy materal such as gas or oil.

An object of the present invention is the provision of a thermally operated device for generating power in which the cost of the device and the cost of providing the heat energy input thereto is extremely low.

A further object is the provision of a device of the nature referred to which can readily be constructed at substantially any location and without the use of highly skilled labor.

BRIEF SUMMARY OF THE INVENTION

A thermal engine according to the present invention comprises two substantially upright legs or columns or vessels communicating at the upper and lower ends to form a closed path. One of the columns is heated so that liquid rises therein while the other remains unheated or cooled so that liquid descends therein. A fluid operated rotary member, such as a water wheel or the like, is installed in the closed path, preferably in the upper portion thereof, and will supply power to a shaft connected thereto.

The column in which the liquid rises may be heated by sunlight, for example, by attaching panels to the column in heat exchange relation therewith and disposed so as to absorb heat from the sunlight. Reflecting mirrors can also be employed to concentrate sunlight on the panels to increase the amount of heat supplied to the liquid within the column. In general, water will be used, but other liquids having a higher coefficient of thermal expansion, for example, petroleum can be employed in the device of the present invention.

The column in which the liquid descends may be caused to remain cool, for example, by painting the column white so as to reflect sunlight, or providing the column with a polished surface which will reflect sunlight. Further, the cold column could be cooled by providing a jacket around the column and moving cooling liquid such as water or air through the jacket.

It will be apparent that the height of the columns is substantially unlimited so that a unit constructed according to the present invention could be of substantial size and liquid flow therein might reach such velocity that the rotary power absorbing member therein could be in the form of a turbine rather than a simple water wheel.

The cooling of the column in which the fluid descends becomes simplified if a body of water, such as a lake or river, is close at hand because power derived from a machine can be employed for pumping cooling water to be passed along the cold column, or by spraying it thereon.

It is possible, furthermore, to arrange the column in which the liquid rises to be heated by combustion such as by burning waste material, for example, by connecting a panel to the column in heat exchange relation therewith and positioning it over the place where the combustible material is burned.

When the heated column is to be heated by sunlight, the effective area of the column can be increased by using a plurality of panels connected thereto and distributed therealong and which may be connected directly to the column or may heat liquid passing through pipe coils surrounding the column. Where radiation of heat from the column is to be inhibited, the column may be insulated. The hot column may also be tilted, particularly where the unit is of large size, so that the panels can be disposed thereon and in such a manner that none will cast a shadow on another.

The entire device, if not excessively large, can be movably supported so that it can be placed and adjusted so that it is always in the best position for receiving sunlight and can even be constructed so as automatically to follow the apparent movement of the sun.

It is possible in certain regions to employ geothermal energy, namely, hot water derived from the earth, as the heat source for the heated column, and this can be supplied to the heated column as by using a jacket around the column. In such a case, panels may be connected to the cooler column for cooling purposes with the panels being in heat exchange relation with the cooler column and also with the atmosphere. Means may be provided to regulate the speed of the rotary member which absorbs power from the moving liquid in the device, and this can take the form of, for example, a gate or valve arrangement for regulating the speed of movement of the liquid in the device.

The nature of the present invention and the advantages and objects thereof will become more apparent upon reference to the following detailed specification taken in connection with the accompanying drawings in which:

FIG. 1 is a perspective view showing a device according to the present invention.

FIG. 2 is a side elevational view of a device according to the present invention in which the heated column is disposed at an angle.

FIG. 3 is a schematic side elevational view showing the use of hot water for heating the column in which liquid rises and the use of panels for cooling the column in which liquid descends.

DETAILED DESCRIPTION OF THE INVENTION

Referring to the drawings somewhat more in detail, the device comprises columns $c$ and $h$ interconnected at the bottom and connected at the top as by way of an upwardly opening reservoir chamber into which the upper ends of the columns extend. The columns are peripherally closed as indicated by the end walls $b$ and $g$ in FIG. 1. Toward the bottom of column $c$, a panel $a$ is provided extending outwardly and at one end in heat exchange relation with the column.

Combustible material indicated at 1 may be disposed beneath panel $a$ and ignited so that panel $a$ is heated with this heat passing into the liquid in column c so that the liquid rises therein. Panel a may be coated with heat insulating material so that heat is not lost therefrom except into column c. In the region connecting the upper ends of the columns, indicated at d, there is a water wheel e having a shaft connected thereto and extending outside the device and from which shaft power can be taken for the driving of a generator or other mechanisms. Belts, chains or gears, or direct couplings can be employed for this purpose.

By making use of a portion of the power supplied to water wheel e, the generator indicated at f can be employed for aiding in the cooling of column h by providing an air current that improves the heat transmission in the descending column of the device.

The external surface of column h is treated, as by painting, to impart anti-reflective characteristics thereto and to dissipate the heat therefrom. The panels al may be vetically disposed one above the other (FIG. 3) within the rectangle also marked al because, in this case, it is not necessary for the panels to be disposed so as to avoid one panel shading another.

Heat insulation may be applied any place on the device that it is desired to inhibit heat loss therefrom, as, for example, on the external surfaces of the heated column c and on the lower face of panel a in case this panel is provided for absorbing sunlight.

Panel a has been referred to as being heated by combustible material from beneath, but it can also serve as a reservoir for sunlight and be heated thereby, either directly or by way of reflected sunlight, as from a curved beam concentrator which could be arranged to concentrate a large amount of sunlight on the area of panel a.

As will be seen in FIG. 2, the rising column c could be disposed at an incline and have panels a2 connected thereto and so disposed as to receive sunlight but being arranged so that no panel shades another. In FIG. 2, the descending column h is provided with a jacket o through which cooling fluid is passed from the inlet h1 at the bottom to the outlet h2 at the top thereby assisting in extracting heat from the liquid and increasing the efficiency of the device. A liquid spray can be provided by a manifold n surrounding the cooler column h at the upper end and such water could, if desired, be conveyed downwardly through jacket o.

In the case of the device of FIG. 2, which could be made in a rather large size, the rotary member could comprise a turbine m so arranged within the device that water enters the top at m2 and flows peripherally therefrom at m3.

The turbine m could also be installed in the lower leg of the device as indicated in dashed outline at m1 in FIG. 2.

Referring again to FIG. 3, it will be noted that a jacket o is provided about the column in which liquid rises and adapted for receiving heating liquid for heating the column. Such heating liquid may, as mentioned above, be derived from a geological source.

If desired, the device as shown schematically in FIG. 1 can be rotated on an axle in the journal boxes k to position the device in the best location to receive the sunbeams.

Modifications may be made within the scope of the appended claims.

What is claimed is:

1. A thermosiphon engine comprising channel means defining a closed path for liquid flow and including a pair of upstanding columns, said columns including a first column in which liquid flows upwardly and a second column in which liquid flows downwardly, a liquid actuated rotary member in said path having a shaft from which power can be taken as liquid flows in said path and actuates said member, said first column comprising first means to absorb heat and said second column comprising second means to reflect or radiate heat.

2. A thermosiphon engine according to claim 1 in which said rotary member is disposed in said path between the upper ends of said columns.

3. A thermosiphon engine according to claim 1 in which said first means comprise panel elements exposed to sunlight and in heat exchange with said first column, and heat insulation on the sides of said panels which face away from the sunlight.

4. A thermosiphon engine according to claim 3 in which said first column is inclined and said panelss are distributed therealong to prevent an upper panel from shading a lower panel.

5. A thermosiphon engine according to claim 1 in which said second means includes means for circulating a coolant fluid along said second column in heat exchange relation therewith.

6. A thermosiphon engine according to claim 5 in which said fluid is air.

7. A thermosiphon engine according to claim 5 in which said fluid is water.

8. A thermosiphon engine according to claim 1 in which said first means compriss a heat conductive element connected to said first column near the bottom in heat exchange relation therewith and projecting therefrom and adapted for being heated by combustible material placed beneath the element and ignited.

9. A thermosiphon engine according to claim 1 in which said second means includes a jacket surrounding said second column and adapted to have a cooling fluid passed therethrough.

10. A thermosiphon engine according to claim 1 in which said second means includes panel means connected to said second column in heat exchange relation therewith and projecting therefrom and operable to produce a cooling effect on the liquid descending in said second column.

11. A method of thermosiphon energy conversion comprising the steps of:
heating a liquid and causing said liquid to flow upwardly in a first liquid conduit whereby thermal energy is converted to mechanical liquid flow energy;
causing said liquid to flow from an upper part of said first conduit to the upper portion of a second liquid conduit wherein said liquid flows downwardly in said second conduit causing a siphoning of the liquid in said first conduit;
causing said liquid to flow from a lower part of said second conduit to a lower part of said first conduit thus providing a flowing liquid path; and
placing a liquid actuated rotary member in the flowing liquid path whereby the mechanical flow energy is converted to rotary energy.

12. The method of claim 10 including the step of cooling the liquid as it flows downwardly in the second conduit.

13. The method of claim 10 including the steps of inclining said first conduit; and placing a plurality of heat absorbing panels in heat conducting relation to said first liquid conduit.

* * * * *

UNITED STATES PATENT AND TRADEMARK OFFICE
CERTIFICATE OF CORRECTION

PATENT NO. : 4,022,024
DATED : May 10, 1977
INVENTOR(S) : Eugenio Eibenschutz Abeles It is certified that error appears in the above-identified patent and that said Letters Patent are hereby corrected as shown below:

Col. 1, line 22, "materail" should be -- material --

Col. 3, line 19, "vetically" should be -- vertically --

Col. 4, line 18 (Claim 4) "panelss" should be -- panels --

Col. 4, line 29 (Claim 8) "compriss" should be -- comprises --

Col. 4, line 61 (Claim 12) "10" should be - 11 --

Col. 4, line 64 (Claim 13) "10" should be -- 11 --

Signed and Sealed this

Thirteenth Day of September 197

[SEAL]

Attest:

RUTH C. MASON
*Attesting Officer*

LUTRELLE F. PARKER
*Acting Commissioner of Patents and Trademar*